(12) United States Patent
Takata

(10) Patent No.: US 11,205,784 B2
(45) Date of Patent: Dec. 21, 2021

(54) FUEL CELL AND METHOD FOR MANUFACTURING SEPARATOR FOR FUEL CELL INCLUDING CONDUCTIVE PARTICLES AND CARBON FIBERS BURIED IN PROJECTING PARTS

(71) Applicant: TOYOTA JIDOSHA KABUSHIKI KAISHA, Toyota (JP)

(72) Inventor: Satoshi Takata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/374,177

(22) Filed: Apr. 3, 2019

(65) Prior Publication Data

US 2019/0326613 A1    Oct. 24, 2019

(30) Foreign Application Priority Data

Apr. 24, 2018    (JP) .............................. JP2018-082830

(51) Int. Cl.
*H01M 8/0247* (2016.01)
*H01M 8/0258* (2016.01)
(Continued)

(52) U.S. Cl.
CPC ....... *H01M 8/0247* (2013.01); *H01M 8/0206* (2013.01); *H01M 8/0215* (2013.01);
(Continued)

(58) Field of Classification Search
CPC ............. H01M 8/0247; H01M 8/0258; H01M 8/0228; H01M 8/0206; H01M 8/0215;
(Continued)

(56) References Cited

U.S. PATENT DOCUMENTS 6,660,419 B1 * 12/2003 Nishida ............... H01M 8/0228
429/484

FOREIGN PATENT DOCUMENTS

| JP | 2006-004853 A | 1/2006 |
| JP | 2006-140095 A | 6/2006 |

(Continued)

OTHER PUBLICATIONS

Machine translation of JP 2014-139884, Takai et al., 2014 (Year: 2014).*

*Primary Examiner* — Kwang Han
(74) *Attorney, Agent, or Firm* — Sughrue Mion, PLLC

(57) ABSTRACT

A fuel cell according to the present disclosure includes separators 11 and 12 made of metal and having projection-depression shapes, and gas diffusion layers 13 and 14. Conductive particles 21 are buried in a projecting part on one surface of each of the separators 11 and 12, and carbon fibers 22 are buried in a projecting part on the other surface of each of the separators 11 and 12. The projecting parts on the one surfaces of the separators 11 and 12 abut against each other so that the conductive particles 21 buried in these projecting parts come into contact with each other. Further, the projecting parts on the other surfaces of the separators 11 and 12 abut against the gas diffusion layers 13 and 14, respectively, so that the carbon fibers 22 buried in these projecting parts come into contact with the gas diffusion layers 13 and 14, respectively.

6 Claims, 7 Drawing Sheets

(51) Int. Cl.
 *H01M 8/0228* (2016.01)
 *H01M 8/0206* (2016.01)
 *H01M 8/0215* (2016.01)
 *B21D 22/02* (2006.01)

(52) U.S. Cl.
 CPC ....... *H01M 8/0228* (2013.01); *H01M 8/0258* (2013.01); *B21D 22/02* (2013.01)

(58) Field of Classification Search
 CPC ..... H01M 8/2465; B21D 22/02; B21D 37/10; Y02E 60/50; Y02P 70/50
 See application file for complete search history.

(56) References Cited

FOREIGN PATENT DOCUMENTS

| | | | | |
|---|---|---|---|---|
| JP | 2014139884 | * | 7/2014 | ............. H01M 8/02 |
| JP | 2015-210976 A | | 11/2015 | |

* cited by examiner

FUEL CELL AND METHOD FOR MANUFACTURING SEPARATOR FOR FUEL CELL INCLUDING CONDUCTIVE PARTICLES AND CARBON FIBERS BURIED IN PROJECTING PARTS

CROSS REFERENCE TO RELATED APPLICATIONS

This application is based upon and claims the benefit of priority from Japanese patent application No. 2018-082830, filed on Apr. 24, 2018, the disclosure of which is incorporated herein in its entirety by reference.

BACKGROUND

The present disclosure relates to a fuel cell and a method for manufacturing a separator for a fuel cell (hereinafter also referred to as "a fuel cell separator").

A fuel cell is formed by stacking a plurality of unit cells. Each unit cell includes a pair of separators and a membrane electrode gas diffusion layer assembly (MEGA: Membrane Electrode Gas Diffusion Layer Assembly) disposed between the pair of separators. As separators, separators made of metal (hereinafter also referred to as metallic separators) that can be manufactured by press-forming and have excellent productivity are often used. In particular, separators can be manufactured at low cost by using a stainless steel material as their material. Japanese Unexamined Patent Application Publication No. 2006-140095 discloses a method for manufacturing metallic separators for fuel cells.

SUMMARY

The present inventor has found the following problem. A passive film having a high electric resistance is formed on a surface of a metallic separator. Therefore, there is a problem that when metallic separators are used as separators for fuel cells, contact resistances between adjacent separators and contact resistances between separators and gas diffusion layers increase.

In the technique disclosed in Japanese Unexamined Patent Application Publication No. 2006-140095, in order to solve the above-described problem, conductive particles are disposed so that they penetrate a passive film formed on a surface of a separator. By providing conductive particles so as to penetrate the passive film as described above, an electric resistance on the surface of the separator can be reduced. In the technique disclosed in Japanese Unexamined Patent Application Publication No. 2006-140095, conductive particles are disposed on the entire surface of the separator.

However, the parts in the fuel cell separator that need to be conductive are parts that are brought into contact with an adjacent separator or a gas diffusion layer. Therefore, it is unnecessary to provide conductive particles on the entire surface of the separator. That is, in the case where conductive particles are provided on the entire surface of the separator as in the technique disclosed in Japanese Unexamined Patent Application Publication No. 2006-140095, an amount of conductive particles to be used increases, thus causing a problem that a manufacturing cost for the separator increases.

In view of the above-described problem, an object of the present disclosure is to provide a fuel cell and a method for manufacturing a fuel cell separator capable of reducing a manufacturing cost for the separator while improving conductivity on a surface of the separator.

A first exemplary aspect is a fuel cell including: a first separator made of metal and having a projection-depression shape; a second separator made of metal and having a projection-depression shape, the first and second separators being configured so that a projecting part on one surface of the second separator abuts against a projecting part on one surface of the first separator, and a depressed part on the one surface of the second separator is opposed to a depressed part on the one surface of the first separator, thereby forming a flow path therebetween; a first gas diffusion layer configured to abut against a projecting part on another surface of the first separator, and configured to diffuse a first gas flowing through a depressed part on the another surface of the first separator; and a second gas diffusion layer configured to abut against a projecting part on another surface of the second separator, and configured to diffuse a second gas flowing through a depressed part on the another surface of the second separator. Conductive particles are buried in the projecting part on the one surface of each of the first and second separators, and carbon fibers are buried in the projecting part on the another surface of each of the first and second separators. The projecting parts on the one surfaces of the first and second separators abut against each other so that the conductive particles buried in these projecting parts come into contact with each other. The projecting parts on the another surfaces of the first and second separators abut against the first and second gas diffusion layers, respectively, so that the carbon fibers buried in these projecting parts come into contact with the first and second gas diffusion layers, respectively.

As described above, in the fuel cell according to the present disclosure, conductive particles are buried in the projecting part on the one surface of each of the first and second separators, and carbon fibers are buried in the projecting part on the other surface of each of the first and second separators. Therefore, when it is desired to improve conductivity on a surface of a fuel cell separator, it is possible to impart conductivity only to a part(s) that needs to be conductive in the fuel cell separator, i.e., only to a projecting part(s) that is brought into contact with an adjacent separator or a gas diffusion layer. Therefore, it is possible to reduce the amount of conductive particles to be used as compared to the case where conductive particles are provided on the entire surface of the separator. Further, carbon fibers are buried on the other surface of the separator. Therefore, the amount of conductive particles to be used can be reduced as compared to the case where conductive particles are buried in both surfaces of the separator. Therefore, it is possible to reduce a manufacturing cost while improving conductivity on surfaces of separators.

In the above-described fuel cell, the conductive particles may be tin oxide particles. Since tin oxide is less expensive than noble metals, the manufacturing cost can be reduced by using tin oxide particles as the conductive particles.

In the above-described fuel cell, a particle size of the tin oxide particles may be 5 nm to 10 nm. When the particle size of the conductive particles is smaller than 5 nm, the buried conductive particles do not penetrate the passive film, so that sufficient conductivity may not be developed. On the other hand, when the particle size of the conductive particles is larger than 10 nm, a destructive energy that the buried conductive particles provide to the surface of the separator becomes too large. As a result, the conductive particles could damage not only the passive film but also the separator itself. Therefore, the particle size of the conductive particles is preferably 5 nm to 10 nm.

In the above-described fuel cell, the conductive particles may be buried at corners of the projecting parts on the one surfaces of the first and second separators, and the carbon fibers may be buried at corners of the projecting parts on the another surfaces of the first and second separators. The corners of the projecting parts of the separators have a large contribution to the conductivity. Therefore, the conductivity of the separator can be improved by selectively burying conductive particles or carbon fibers at the corners of the projecting parts.

Another exemplary aspect is a method for manufacturing a fuel cell separator with a projection-depression shape formed on its surface, including sandwiching a metal plate between a first die and a second die, and performing press-forming, in which the first die includes a projecting part and a depressed part, the second die includes a projecting part in a place opposed to the depressed part of the first die and a depressed part in a place opposed to the projecting part of the first die, and a groove filled with conductive particles is formed in a predetermined place in the depressed part of the first die, and the conductive particles contained in the groove are supplied to a surface of the metal plate during the press-forming. In the press-forming of the separator, the press-forming is performed in a state where the metal plate is disposed between the first and second dies, and a carbon fiber sheet is disposed between the metal plate and the second die, so that conductive particles are buried in a projecting part on one surface of the separator and carbon fibers are buried in a projecting part on another surface of the separator.

As described above, in the method for manufacturing a fuel cell separator according to the present disclosure, a groove filled with conductive particles is formed in a predetermined place in the depressed part of the first die. Further, in the press-forming of the separator, the press-forming is performed in a state where the metal plate is disposed between the first and second dies, and a carbon fiber sheet is disposed between the metal plate and the second die. In this way, it is possible to bury conductive particles in a projecting part on one surface of the separator and carbon fibers in a projecting part on the other surface of the separator. Therefore, when it is desired to improve conductivity on a surface of a fuel cell separator, it is possible to impart conductivity only to a part(s) that needs to be conductive in the fuel cell separator, i.e., only to a projecting part(s) that is brought into contact with an adjacent separator or a gas diffusion layer. Therefore, it is possible to reduce the amount of conductive particles to be used as compared to the case where conductive particles are provided on the entire surface of the separator. Further, carbon fibers are buried on the other surface of the separator by using a carbon fiber sheet. Therefore, the amount of conductive particles to be used can be reduced as compared to the case where conductive particles are buried in both surfaces of the separator. Therefore, it is possible to reduce a manufacturing cost while improving conductivity on surfaces of separators.

In the above-described method for manufacturing a fuel cell separator, the conductive particles may be tin oxide particles. Since tin oxide is less expensive than noble metals, the manufacturing cost can be reduced by using tin oxide particles as the conductive particles.

In the above-described method for manufacturing a fuel cell separator, a particle size of the tin oxide particles may be 5 nm to 10 nm. When the particle size of the conductive particles is smaller than 5 nm, the buried conductive particles do not penetrate the passive film, so that sufficient conductivity may not be developed. On the other hand, when the particle size of the conductive particles is larger than 10 nm, a destructive energy that the buried conductive particles provide to the surface of the separator becomes too large. As a result, the conductive particles could damage not only the passive film but also the separator itself. Therefore, the particle size of the conductive particles is preferably 5 nm to 10 nm.

In the above-described method for manufacturing a fuel cell separator, the above-described predetermined place may be a corner of the projecting part of the first die, and the conductive particles may be buried at a corner of the projecting part on the one surface of the separator during the press-forming process. The corners of the projecting parts of the separators have a large contribution to the conductivity. Therefore, the conductivity of the separator can be improved by selectively burying conductive particles at the corners of the projecting parts.

According to the present disclosure, it is possible to provide a fuel cell and a method for manufacturing a fuel cell separator capable of reducing a manufacturing cost for the separator while improving conductivity on a surface of the separator.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure are described hereinafter with reference to the drawings.

Figure 1:
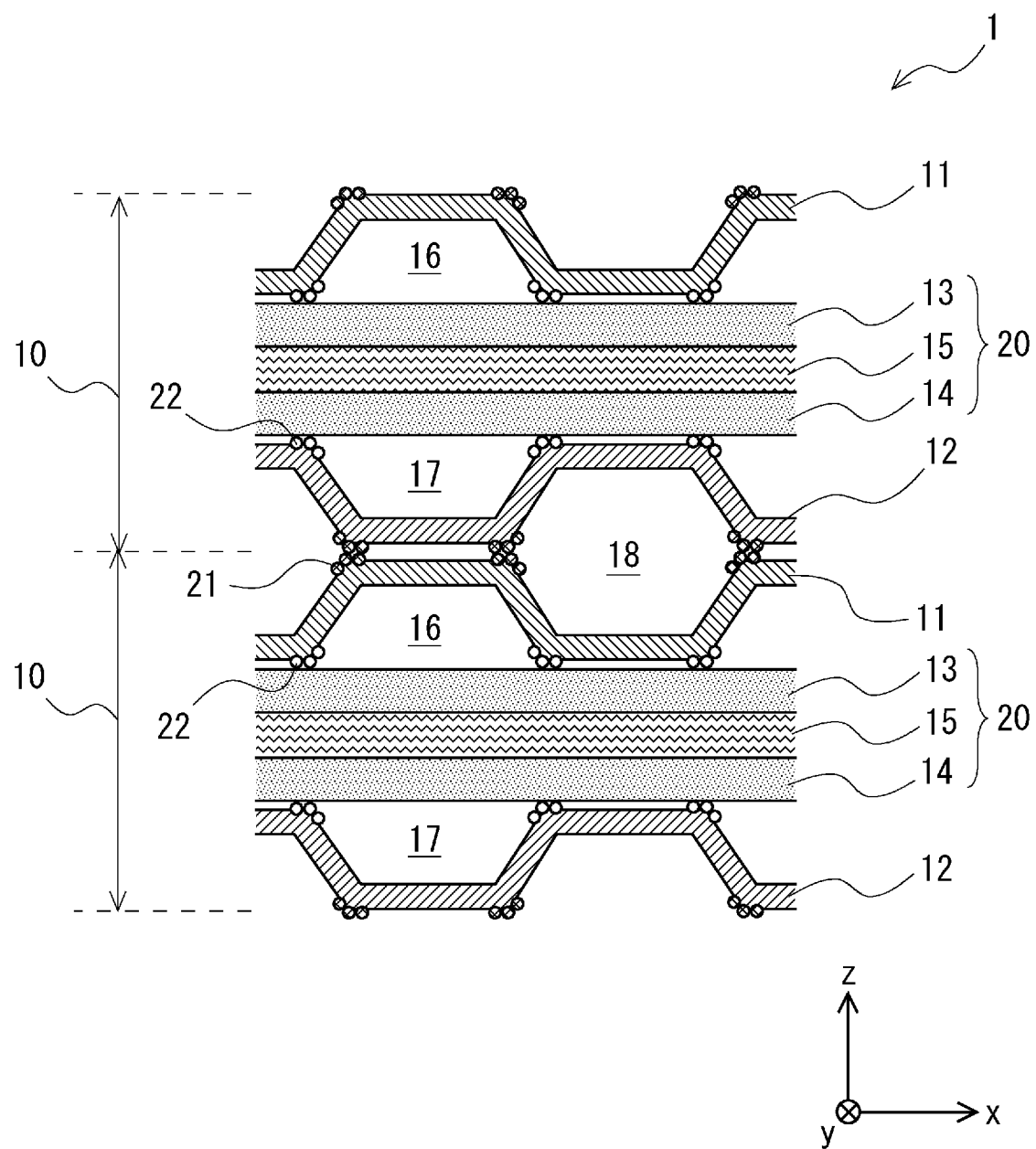
FIG. 1 is a cross section for explaining a fuel cell according to an embodiment.

FIG. 1 is a cross section for explaining a fuel cell according to an embodiment. As shown in FIG. 1, a fuel cell 1 according to this embodiment is formed by stacking a plurality of unit cells 10. Each unit cell 10 includes separators 11 and 12, gas diffusion layers 13 and 14, and a membrane electrode assembly 15. Note that the gas diffusion layers 13 and 14 and the membrane electrode assembly 15 constitutes an MEGA (Membrane Electrode Gas diffusion layer Assembly) 20. Further, each MEGA 20 is sandwiched by its own separators 11 and 12.

Each of the separators 11 and 12 has a projection-depression shape. A projecting part of the separator 11 that projects toward the negative side in the z-axis direction (hereinafter also expressed as "the z-axis negative side") abuts against (i.e., is in contact with) the gas diffusion layer 13. Further, a space enclosed with a depressed part of the separator 11 that is depressed into the positive side in the z-axis direction (hereinafter also expressed as "the z-axis positive side") and the gas diffusion layer 13 functions as a gas flow path 16. A gas flowing through the gas flow path 16 is diffused into (supplied to) the membrane electrode assembly 15 through the gas diffusion layer 13. The gas diffusion layer 13 can be formed by using a conductive member having gas permeability (e.g., a porous carbon element).

A projecting part of the separator 12 that projects toward the z-axis positive side abuts against (i.e., is in contact with) the gas diffusion layer 14. Further, a space enclosed with a depressed part of the separator 12 that is depressed into the z-axis negative side and the gas diffusion layer 14 functions as a gas flow path 17. A gas flowing through the gas flow path 17 is diffused into (supplied to) the membrane electrode assembly 15 through the gas diffusion layer 14. The gas diffusion layer 14 can be formed by using a conductive member having gas permeability (e.g., a porous carbon element).

The membrane electrode assembly 15 is formed by using an electrolyte membrane and electrode catalyst layers disposed on both surfaces of the electrolyte membrane. When an anode gas and a cathode gas are supplied to the membrane electrode assembly 15, power is generated by an oxidation-reduction reaction of the anode gas and the cathode gas. For example, the anode gas is a hydrogen gas and the cathode gas is oxygen (air).

Assuming that, for example, the z-axis negative side of each unit cell 10 is the anode side and the z-axis positive side thereof is the cathode side, the cathode gas flows through the gas flow path 16 and the anode gas flows through the gas flow path 17. Conversely, when the z-axis negative side is the cathode side and the z-axis positive side is the anode side, the anode gas flows through the gas flow path 16 and the cathode gas flows through the gas flow path 17.

As shown in FIG. 1, the fuel cell 1 according to this embodiment is formed by stacking a plurality of unit cells 10. When unit cells 10 are stacked on top one another, they are stacked so that projecting parts of a separator 11 abut against (i.e., are in contact with) respective projecting parts of a separator 12 between each two adjacent unit cells 10. Specifically, unit cells 10 are stacked so that projecting parts of a separator 11 projecting toward the z-axis positive side abut against (i.e., are in contact with) respective projecting parts of a separator 12 projecting toward the z-axis negative side. Note that depressed parts adjacent to projecting parts abutting against each other form a flow path 18. That is, a depressed part of a separator 11 and a depressed part of a separator 12 are opposed to each other, and thereby form a flow path 18. The flow path 18 is a flow path through which a cooling medium (e.g., water) for cooling a respective unit cell 10 flows.

Each of the separators 11 and 12 is a separator made of metal (hereinafter also referred to as a metallic separator). For example, each of the separators 11 and 12 is a thin plate made of stainless steel, titanium, a titanium alloy, an aluminum alloy or the like and having a thickness of about 0.1 to 0.2 mm. Note that a passive film having a high electric resistance is formed on a surface of each of the metallic separators 11 and 12. Therefore, there is a problem that when metallic separators are used as separators 11 and 12 of a fuel cell, contact resistances between adjacent separators 11 and 12, contact resistances between separators 11 and gas diffusion layers 13, and contact resistances between separators 12 and gas diffusion layers 14 increase.

In consideration of this problem, in the fuel cell 1 according to this embodiment, conductive particles 21 are buried in projecting parts on one surface of each of the separator 11 and 12, and carbon fibers are buried in projecting parts on the other surface of each of the separator 11 and 12. Specifically, conductive particles 21 are buried in projecting parts of the separator 11 that project toward the z-axis positive side and carbon fibers are buried in projecting parts of the separator 11 that project toward the z-axis negative side. Further, conductive particles 21 are buried in projecting parts of the separator 12 that project toward the z-axis negative side and carbon fibers are buried in projecting parts of the separator 12 that project toward the z-axis positive side.

Further, when the projecting parts of the separator 11 projecting toward the z-axis positive side are made to abut against (i.e., brought into contact with) the projecting parts of the separator 12 projecting toward the z-axis negative side, they are made to abut against each other so that conductive particles 21 buried in these projecting parts come into contact with each other. Further, when the projecting parts of the separator 11 projecting toward the z-axis negative side are made to abut against (i.e., brought into contact with) the gas diffusion layer 13, they are made to abut against each other so that carbon fibers 22 buried in the projecting parts come into contact with the gas diffusion layer 13. Similarly, when the projecting parts of the separator 12 projecting toward the z-axis positive side are made to abut against (i.e., brought into contact with) the gas diffusion layer 14, they are made to abut against each other 14 so that carbon fibers 22 buried in the projecting parts come into contact with the gas diffusion layer 14.

For example, conductive particles 21 are buried at corners of projecting parts of the separators 11 and 12 (i.e., at both ends of each projecting part in the x-direction of the separator 11 and 12). Similarly, carbon fibers 22 are buried at corners of projecting parts of the separators 11 and 12 (i.e., at both ends of each projecting part in the x-direction of the separator 11 and 12).

The conductive particles 21 are not limited to any particular particles, as long as they exhibit conductivity. Examples of the material for the conductive particles 21 include tin oxide, gold, ITO (Indium Tin Oxide), and carbon nanotubes. In particular, since tin oxide is less expensive than noble metals, a manufacturing cost can be reduced by using tin oxide particles as the conductive particles 21.

Figure 2:
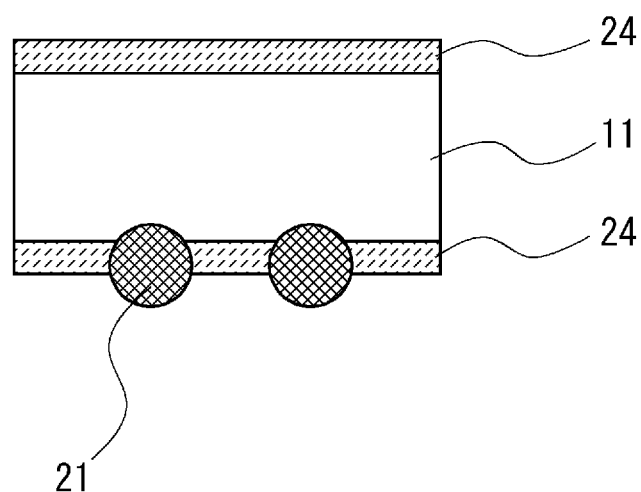
FIG. 2 is an enlarged cross section of a separator included in a fuel cell according to an embodiment.

Further, a particle size (e.g., a particle diameter) of the conductive particles 21 is preferably 5 nm to 10 nm. FIG. 2 is an enlarged cross section of the separator 11. As shown in FIG. 2, passive films 24 are formed on surfaces of the metallic separator 11. In general, each of these passive films 24 has a thickness of about 3 nm. Therefore, when the particle size of the conductive particles 21 is smaller than 5 nm, the buried conductive particles 21 do not penetrate the passive film 24, so that sufficient conductivity may not be developed. Further, the exposed surface areas of the buried conductive particles 21 are reduced, so that sufficient conductivity may not be obtained. On the other hand, when the particle size of the conductive particles 21 is larger than 10 nm, a destructive energy that the conductive particles 21 provide to the surface of the separator 11 becomes too large.

As a result, the conductive particles 21 could damage not only the passive film 24 but also the separator 11 itself, thus possibly causing cracks in the separator 11. For these reasons, the particle size of the conductive particles 21 is preferably 5 nm to 10 nm.

Figure 3:
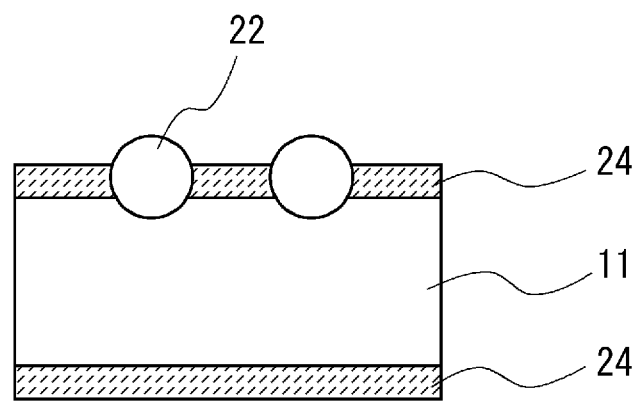
FIG. 3 is an enlarged cross section of a separator included in a fuel cell according to an embodiment.

Similarly, a particle size (e.g., a particle diameter) of the carbon fibers 22 is preferably 5 nm to 10 nm. FIG. 3 is an enlarged cross section of the separator 11. Similarly to FIG. 2, passive films 24 are formed on surfaces of the metallic separator 11 in FIG. 3. In general, each of these passive films 24 has a thickness of about 3 nm. Therefore, when the particle size of the carbon fibers 22 is smaller than 5 nm, the buried carbon fibers 22 do not penetrate the passive film 24, so that sufficient conductivity may not be developed. Further, the exposed surface areas of the buried carbon fibers 22 are reduced, so that sufficient conductivity may not be obtained. On the other hand, when the particle size of the carbon fibers 22 is larger than 10 nm, a destructive energy that the carbon fibers 22 provide to the surface of the separator 11 becomes too large. As a result, the conductive particles 21 could damage not only the passive film 24 but also the separator 11 itself, thus possibly causing cracks in the separator 11. For these reasons, the particle size of the carbon fibers 22 is preferably 5 nm to 10 nm.

Further, a ratio of a surface area occupied by conductive particles 21 (hereinafter referred to as a surface occupying area ratio of conductive particles 21) is preferably 20 to 60%. That is, the surface occupying area ratio of conductive particles 21 per unit area in a projecting part (e.g., corners of a projecting part in the example shown in FIG. 1) of the separators 11 and 12, in which conductive particles 21 are buried, is preferably 20 to 60%.

When the surface occupying area ratio of conductive particles 21 is smaller than 20%, the number of contact points between conductive particles 21 buried in the separator 11 and 12 is reduced and hence the conductivity between the separators 11 and 12 decreases. On the other hand, when the surface occupying area ratio of conductive particles 21 is higher than 60%, gaps are formed between the separators 11 and 12 due to conductive particles that are not buried in the separators 11 and 12. Since these gaps obstruct contact between conductive particles 21 buried in the separators 11 and 12, the conductivity between the separators 11 and 12 decreases. Further, since excessive conductive particles interfere electric currents flowing between buried conductive particles 21, the conductivity between the separators 11 and 12 decreases.

As described above, in the fuel cell according to this embodiment, conductive particles 21 are buried in one surface of each of the separators 11 and 12 and carbon fibers 22 are buried in the other surface of each of the separators 11 and 12. Further, the separators 11 and 12 are made to abut against each other (i.e., brought into contact with each other) so that conductive particles 21 buried in projecting parts on the one surfaces of the separators 11 and 12 come into contact with each other. Further, the separators 11 and 12 made to abut against (i.e., brought into contact with) the gas diffusion layers 13 and 14, respectively, so that carbon fibers 22 buried in projecting parts on the other surfaces of the separators 11 and 12 come into contact with the gas diffusion layers 13 and 14, respectively.

As described above, in the fuel cell according to this embodiment, when it is desired to improve conductivity on a surface of a fuel cell separator, conductivity is imparted only to parts that need to be conductive in the fuel cell separator, i.e., only to projecting parts that are brought into contact with an adjacent separator or a gas diffusion layer.

Therefore, it is possible to reduce the amount of conductive particles to be used as compared to the case where conductive particles are provided on the entire surface of the separator. Further, carbon fibers are buried on the other surface of the separator. Therefore, the amount of conductive particles to be used can be reduced as compared to the case where conductive particles are buried in both surfaces of the separator. Therefore, it is possible to reduce a manufacturing cost while improving conductivity on surfaces of separators.

Figure 4:
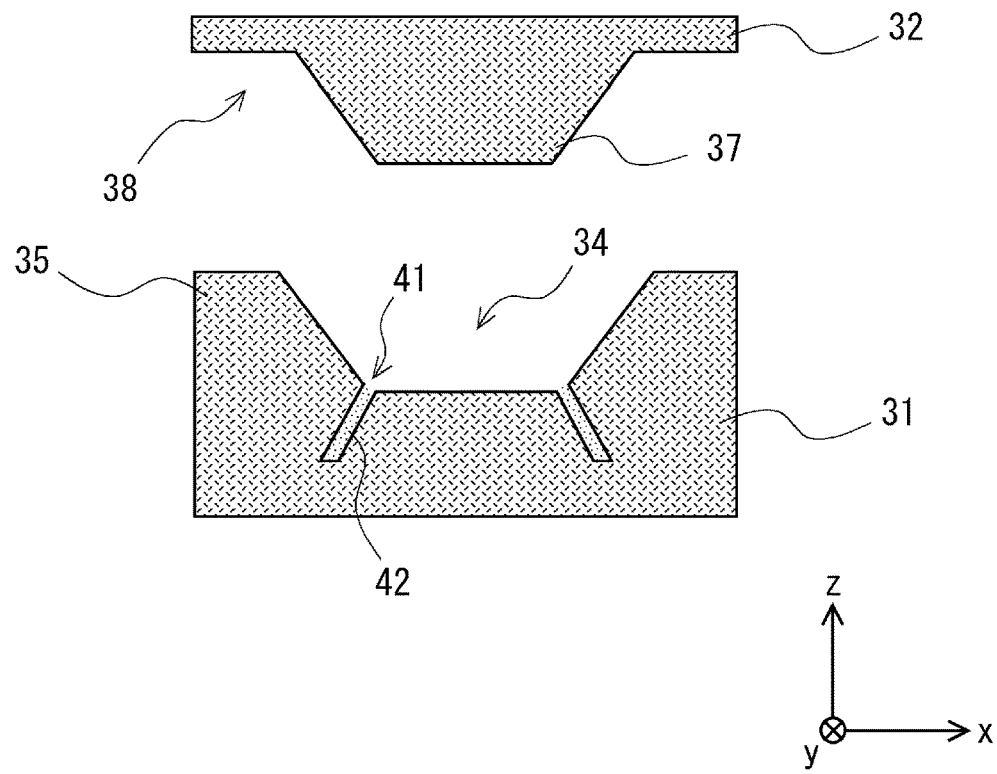
FIG. 4 is a cross section for explaining dies used in a method for manufacturing a fuel cell separator according to an embodiment.

Next, a method for manufacturing a fuel cell separator according to this embodiment is described. FIG. 4 is a cross section for explaining dies used in a method for manufacturing a fuel cell separator according to this embodiment. In this embodiment, a fuel cell separator with a projection-depression shape formed on its surface is manufactured by sandwiching a metal plate between a die 31 disposed on a lower side and a die 32 disposed on an upper side, and performing press-forming.

As shown in FIG. 4, the lower die 31 includes depressed parts 34 and projecting parts 35. The upper die 32 includes projecting parts 37 in places opposed to the depressed parts 34 of the lower die 31 and depressed parts 38 in places opposed to the projecting parts 35 of the lower die 31. Note that in FIG. 4, only parts of the dies 31 and 32 are shown. That is, a plurality of depressed parts and a plurality of projecting parts, which are disposed so as to engage with opposed projecting parts and depressed parts, are successively formed in the x-axis direction in each of the dies 31 and 32.

Grooves 41 filled with conductive particles 42 are formed in predetermined places in each depressed part 34 of the die 31 (i.e., corners of each depressed part 34 of the die 31). The places where the grooves 41 are formed correspond to corners of a projecting part of the separator.

Figure 5:
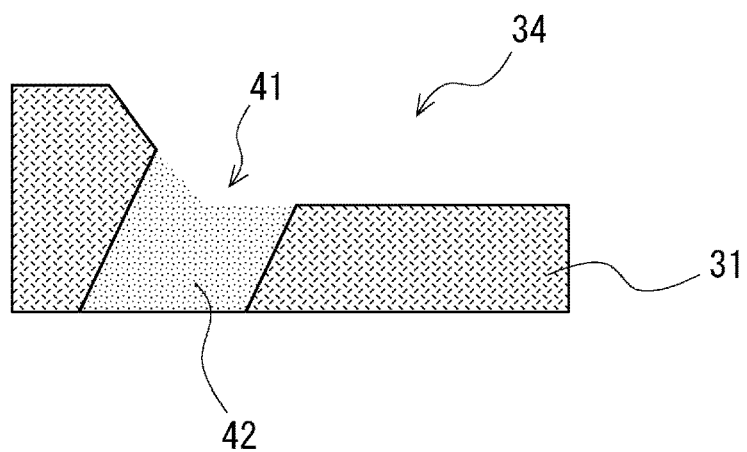
FIG. 5 is an enlarged cross section of the die shown in FIG. 4.

FIG. 5 is an enlarged cross section of the die 31 shown in FIG. 4. As shown in FIG. 5, a groove 41 is filled with conductive particles 42 and the conductive particles 42 contained in the groove 41 are supplied to a surface of a metal plate 51 (see FIG. 6) during the press-forming. That is, when the metal plate 51 is press-formed into a separator, a pressure is applied between the metal plate 51 and conductive particles 42. As a result, conductive particles 42 are buried in the surface of the metal plate 51. The grooves 41 are connected, inside the die 31, to supply means for supplying conductive particles (not shown). Therefore, conductive particles 42 are continuously supplied from the supply means (not shown) to the grooves 41.

As described above, the conductive particles 42 are not limited to any particular particles, as long as they exhibit conductivity. Examples of the material for the conductive particles 42 include tin oxide, gold, ITO (Indium Tin Oxide), and carbon nanotubes. In particular, since tin oxide is less expensive than noble metals, a manufacturing cost can be reduced by using tin oxide particles as the conductive particles 42. Further, for the above-described reasons, a particle size of the conductive particles 42 is preferably 5 nm to 10 nm.

Figure 6:
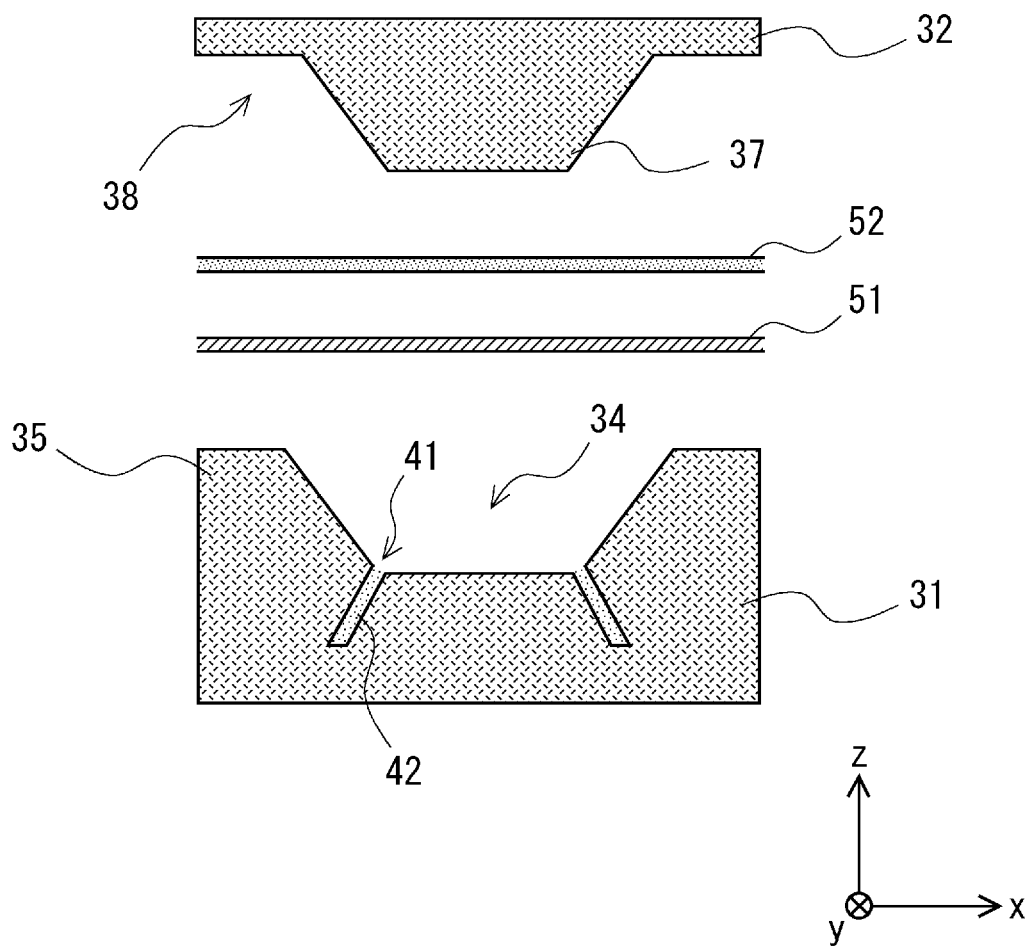
FIG. 6 is a cross section showing a method for manufacturing a fuel cell separator according to an embodiment.

Next, processes for manufacturing a fuel cell separator are described in detail with reference to FIGS. 6 to 8. When a fuel cell separator is press-formed, firstly, a metal plate 51 is disposed between a lower die 31 and an upper die 32, and a carbon fiber sheet 52 is disposed between the metal plate 51 and the upper die 32 as shown in FIG. 6. Note that as the metal plate 51, a thin plate made of stainless steel, titanium, a titanium alloy, an aluminum alloy or the like and having a thickness of about 0.1 to 0.2 mm can be used. For example, stainless steel is preferably used as the metal plate 51 because titanium is more expensive than stainless steel and aluminum has a corrosion resistance lower than that of stainless steel. Note that passive films having a high electric resistance are formed on surfaces of the metal plate 51.

Further, the carbon fiber sheet 52 may be made of the same material as the material for the gas diffusion layer 13 and 14 (see FIG. 1). By using the same material as the material for the gas diffusion layers 13 and 14, it is possible to prevent an increase in the number of types of components to be used and thereby to reduce the manufacturing cost of the separator. Further, for the above-described reasons, the particle size of the carbon fibers constituting the carbon fiber sheet 52 is preferably 5 nm to 10 nm.

Figure 7:
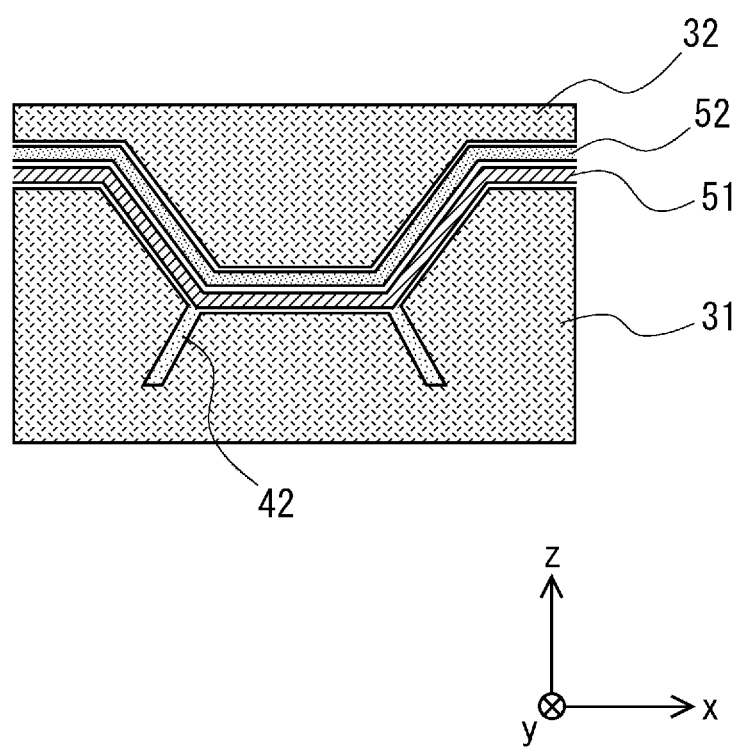
FIG. 7 is a cross section showing a method for manufacturing a fuel cell separator according to an embodiment.

After that, as shown in FIG. 7, the metal plate 51 and the carbon fiber sheet 52 are pressurized through the lower and upper dies 31 and 32, and thereby press-formed into a separator. In this process, conductive particles 42 are buried in projecting parts on one surface (on the z-axis negative side) of the metal plate (the separator) 51. Further, carbon fibers of the carbon fiber sheet 52 are buried in projecting parts on the other surface (on the z-axis positive side) of the metal plate (the separator) 51.

Figure 8:
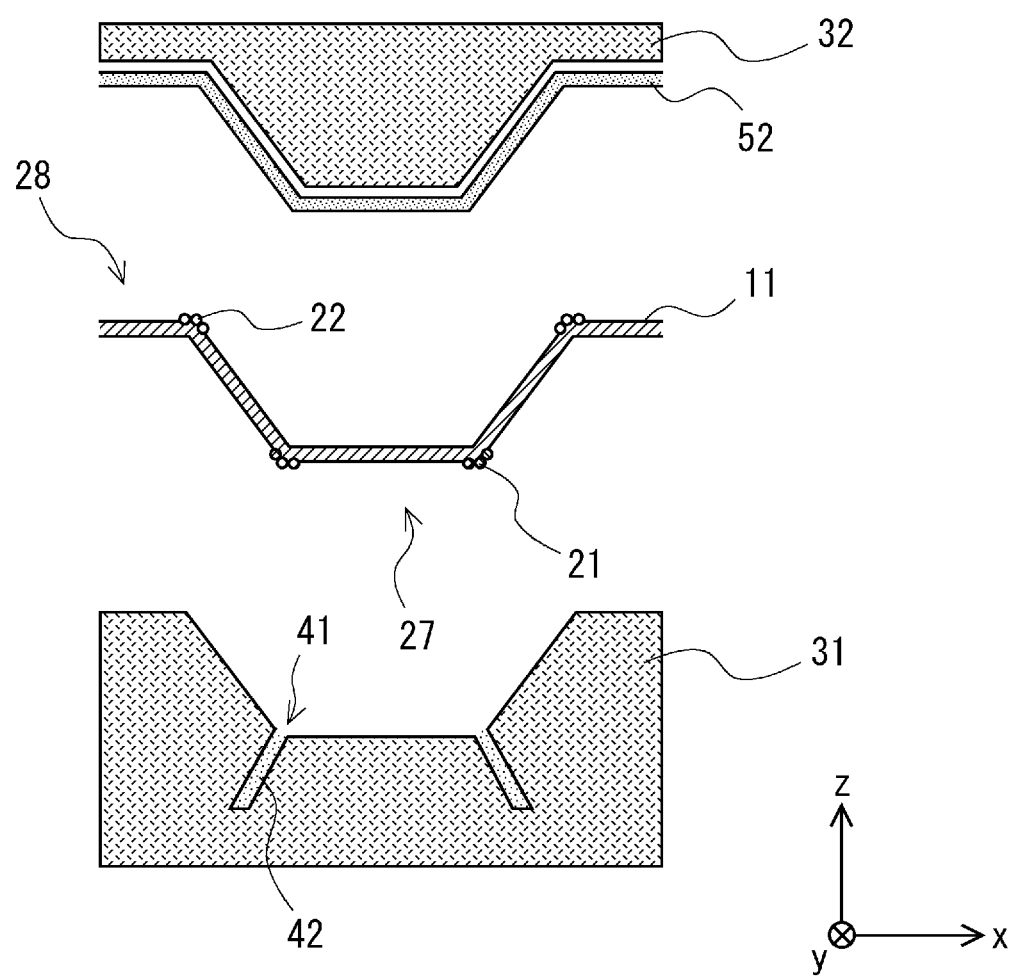
FIG. 8 is a cross section showing a method for manufacturing a fuel cell separator according to an embodiment.

After that, as shown in FIG. 8, the lower and upper dies 31 and 32 are moved away from each other and the formed separator 11 is removed from the dies 31 and 32. As shown in FIG. 8, conductive particles 21 are buried in projecting parts 27 on the surface on the z-axis negative side of the formed separator 11. Further, carbon fibers 22 are buried in projecting parts 28 on the surface on the z-axis positive side of the formed separator 11.

Note that conductive particles 21 and carbon fiber 22 are buried at corners of the projecting parts 27 and 28, respectively. That is, since grooves 41 are formed in places corresponding to corners of the projecting parts 27 of the separator 11 and a force is strongly applied from the lower die 31 to the corners of the projecting parts 27 of the separator 11 during the press-forming, conductive particles 21 are buried at the corners of the projecting parts 27 of the separator 11. Similarly, since a force is strongly applied from the upper die 32 to corners of the projecting parts 28 of the separator 11 during the press-forming, carbon fibers 22 are buried at the corners of the projecting parts 28 of the separator 11.

As described above, the surface occupying area ratio of conductive particles 21 buried in the formed separator 11 is preferably 20 to 60%. That is, the surface occupying area ratio of conductive particles 21 per unit area in a projecting part (e.g., corners of a projecting part in the example shown in FIG. 1) of the separators 11 and 12, in which conductive particles 21 are buried, is preferably 20 to 60%. Note that the amount of conductive particles 21 buried in the separator 11 can be adjusted by changing the pressure or/and the pressurizing time in the press-forming, or/and the amount of conductive particles 42 that come into contact with the metal plate 51 (i.e., the amount of conductive particles 42 contained in the grooves 41) or the like.

As described above, in the method for manufacturing a fuel cell separator according to this embodiment, grooves 41 filled with conductive particles 42 are formed in predetermined places in a depressed part 34 of the die 31. Further, when a separator is press-formed, the press-forming is performed in a state where a metal plate 51 is disposed between the dies 31 and 32, and a carbon fiber sheet 52 is disposed between the metal plate 51 and the die 32. In this way, it is possible to bury conductive particles 21 in projecting parts 27 on one surface of the separator 11 and bury carbon fibers 22 in projecting parts 28 on the other surface of the separator 11.

As described above, in the method for manufacturing a fuel cell separator according to this embodiment, it is possible to impart conductivity only to parts that need to be conductive in the fuel cell separator, i.e., only to projecting parts that are brought into contact with an adjacent separator or a gas diffusion layer. Therefore, it is possible to reduce the amount of conductive particles to be used as compared to the case where conductive particles are provided on the entire surface of the separator. Further, carbon fibers are buried on the other surface of the separator by using a carbon fiber sheet. Therefore, the amount of conductive particles to be used can be reduced as compared to the case where conductive particles are buried in both surfaces of the separator. Therefore, it is possible to reduce a manufacturing cost while improving conductivity on surfaces of separators.

Further, in this embodiment, conductive particles 21 are selectively buried at corners of projecting parts 27 of the formed separator 11. That is, it is possible to improve the conductivity of the separator 11 while reducing the amount tin oxide to be used by selectively burying conductive particles 21 at corners of projecting parts 27, which have a large contribution to the conductivity of the separator 11, rather than burying them in centers of projecting parts 27, which have a small contribution to the conductivity of the separator 11.

EXAMPLE

Next, an example according to the present disclosure is described.

In an example, a separator was manufactured by using the dies 31 and 32 shown in FIG. 4. When the separator was manufactured, the separator was press-formed by the manufacturing process shown in FIGS. 6 to 8. As the metal plate, a coil formed by a plate made of stainless steel (SUS447) and having a thickness of 0.1 mm was used. Stainless steel was used because titanium is more expensive than stainless steel and aluminum has a corrosion resistance lower than that of stainless steel.

Further, as the conductive particles, tin oxide particles were charged into grooves 41 of the die 31 shown in FIG. 4. As the tin oxide particles, antimony-doped tin oxide particles having a particle size of 10 nm (ATO, T-1 manufactured by Mitsubishi Materials Corporation) were used. Note that the particle size of tin oxide particles can be measured by using a scanning electron microscope (SEM: Scanning Electron Microscope) or a transmission electron microscope (TEM: Transmission Electron Microscope).

As the carbon fiber sheet (the gas diffusion layer), carbon paper having a thickness of 0.11 mm (TGP-H030 manufactured by Toray Industries, Inc.) was used. If the thickness of the carbon fiber sheet is large, its modulus of elasticity increases, thus raising a possibility that the carbon fiber sheet may be broken (or cracked) in the press-forming. Therefore, it is preferable to use carbon paper having a thickness of about 0.11 mm. Note that as the carbon fiber sheet, carbon paper with carbon nanotubes (manufactured by Microphase Co., Ltd. Inc.) may be used. However, there is a disadvantage that carbon paper with carbon nanotubes is expensive.

A separator was press-formed by the manufacturing process shown in FIGS. 6 to 8 by using the above-described materials. That is, firstly, as shown in FIG. 6, a metal plate 51 and a carbon fiber sheet 52 were disposed between lower and upper dies 31 and 32. Then, as shown in FIG. 7, the metal plate 51 and the carbon fiber sheet 52 were pressurized though the lower and upper dies 31 and 32, and thereby press-formed into a separator. After that, as shown in FIG. 8, the lower and upper dies 31 and 32 were moved away from each other and the formed separator 11 was removed from the dies 31 and 32.

A plurality of samples were manufactured by the above-described method and a relation between surface occupying area ratios (hereinafter also simply referred to as "area ratios") of tin oxide particles and their contact resistances was examined for the formed separators 11. Note that the amount of conductive particles burred in the separator 11 was adjusted by changing the pressure or/and the pressurizing time in the press-forming, or/and the amount of conductive particles that came into contact with the metal plate or the like.

The contact resistance means a contact resistance between formed separators. That is, the contact resistance was measured in a state in which projecting parts of formed separators brought into contact with each other and a pressure of 0.98 MPa was applied to each of the separators. Specifically, a voltage value between the separators was measured in a state in which projecting parts of the separators, in which tin oxide particles were buried, were brought into contact with each other and a constant current was made to flow between the separators.

Further, the area ratio of tin oxide particles was obtained by calculating a ratio of an area of tin oxide particles at corners of a projecting part of the separator. The area ratio of tin oxide particles was converted into numerical values (i.e., expressed by numerical values) by carrying out TOF-SIMS (Time-of-Flight Secondary Ion Mass Spectrometry) analysis for the outermost surface of the separator and obtaining element distributions of Fe, which was the main component of stainless steel, and Sn, which was a component of tin oxide.

Figure 9:
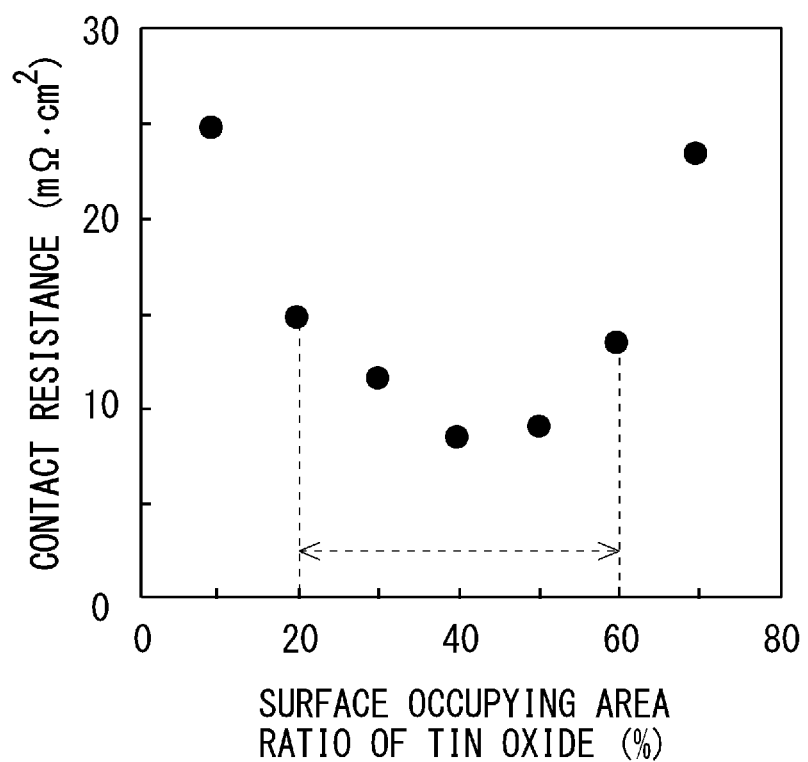
FIG. 9 is a graph showing a relation between surface occupying area ratio of tin oxide and contact resistances.

FIG. 9 shows a relation between surface occupying area ratios of tin oxide particles and contact resistances thereof. When the area ratio of tin oxide was 0% (not shown), i.e., when tin oxide was not buried at all in separators, no current flowed between the separators. That is, the contact resistance between the separators was very high. In contrast, when tin oxide was buried in separators, current flowed between the separators.

Specifically, as the area ratio of tin oxide particles was increased from 10% to 40%, the contact resistance between the separators decreased. Further, the contact resistance reached the minimum value when the area ratio of tin oxide particles was 40%. Then, as the area ratio of tin oxide particles was further increased from 40% to 70%, the contact resistance between the separators increased. Based on the result shown in FIG. 9, when the area ratio of tin oxide particles was 20% to 60%, the contact resistance between the separators was smaller than 20 mΩ·cm$^2$ and thus exhibited satisfactory values.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell comprising:
   a first separator made of metal and having a projection-depression shape;
   a second separator made of metal and having a projection-depression shape, the first and second separators being configured so that a projecting part on one surface of the second separator abuts against a projecting part on one surface of the first separator, and a depressed part on the one surface of the second separator is opposed to a depressed part on the one surface of the first separator, thereby forming a flow path therebetween;
   a first gas diffusion layer configured to abut against a projecting part on another surface of the first separator, and configured to diffuse a first gas flowing through a depressed part on the another surface of the first separator; and
   a second gas diffusion layer configured to abut against a projecting part on another surface of the second separator, and configured to diffuse a second gas flowing through a depressed part on the another surface of the second separator, wherein
   conductive particles are buried in the projecting part on the one surface of each of the first and second separators, and carbon fibers are buried in the projecting part on the another surface of each of the first and second separators,
   the projecting parts on the one surfaces of the first and second separators abut against each other so that the conductive particles buried in these projecting parts come into contact with each other,
   the projecting parts on the another surfaces of the first and second separators abut against the first and second gas diffusion layers, respectively, so that the carbon fibers buried in these projecting parts come into contact with the first and second gas diffusion layers, respectively,
   the conductive particles are buried at corners of the projecting parts on the one surfaces of the first and second separators, and the carbon fibers are buried at corners of the projecting parts on the another surfaces of the first and second separators, and
   a surface occupying area ratio of the conductive particles per unit area at the corners of the projecting parts on the one surfaces of the first and second separators is 20 to 60%.

2. The fuel cell according to claim 1, wherein the conductive particles are tin oxide particles.

3. The fuel cell according to claim 2, wherein a particle size of the tin oxide particles is 5 nm to 10 nm.

4. A method for manufacturing a fuel cell separator with a projection-depression shape formed on its surface, comprising sandwiching a metal plate between a first die and a second die, and performing press-forming, wherein
   the first die comprises a projecting part and a depressed part,
   the second die comprises a projecting part in a place opposed to the depressed part of the first die and a depressed part in a place opposed to the projecting part of the first die,
   a groove filled with conductive particles is formed in a predetermined place in the depressed part of the first die, and the conductive particles contained in the groove are supplied to a surface of the metal plate during the press-forming, and
   in the press-forming of the separator, the press-forming is performed in a state where the metal plate is disposed between the first and second dies, and a carbon fiber sheet is disposed between the metal plate and the second die, so that conductive particles are buried in a projecting part on one surface of the separator and carbon fibers are buried in a projecting part on another surface of the separator, wherein the predetermined place is a corner of the projecting part of the first die, and the conductive particles are buried at a corner of the projecting part on the one surface of the separator during the press-forming process, and a surface occupying area ratio of the conductive particles per unit area at the corner of the projecting part on the one surface of the separator is 20 to 60%.

5. The method for manufacturing a fuel cell separator according to claim 4, wherein the conductive particles are tin oxide particles.

6. The method for manufacturing a fuel cell separator according to claim 5, wherein a particle size of the tin oxide particles is be 5 nm to 10 nm.

* * * * *